Oct. 1, 1929.  J. FAULK  1,730,034
COOKING UTENSIL
Filed Nov. 18, 1925

INVENTOR.
Jacob Faulk
BY
Fay, Oberlin & Fay
ATTORNEYS.

Patented Oct. 1, 1929

1,730,034

UNITED STATES PATENT OFFICE

JACOB FAULK, OF ST. LOUIS, MISSOURI

COOKING UTENSIL

Application filed November 18, 1925. Serial No. 69,799.

Aluminum utensils have many well known advantages, but in certain uses, however, they are subject to the objection that materials heated therein tend excessively to stick and burn. The tendency to warpage and distortion of the portion of the utensils especially subjected to heat is also quite pronounced.

In accordance with the present invention, utensils having the general advantages of aluminum but without the marked disadvantages thereof may be provided.

To the accomplishment of the foregoing and related ends, the invention, then consists of the means hereinafter fully described and particularly pointed out in the claims, the annexed drawing and the following description setting forth in detail certain construction embodying the invention, such disclosed means constituting, however, but a few of the various forms in which the principle of the invention may be used.

In said annexed drawing:—

Figure 1:
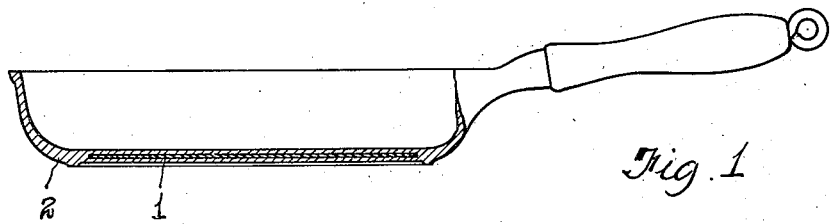
Figure 2:
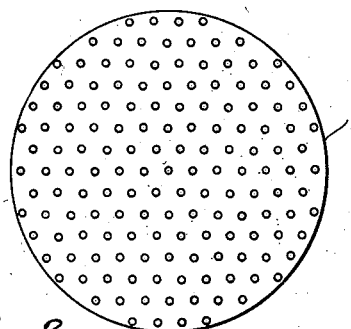
Figure 3:
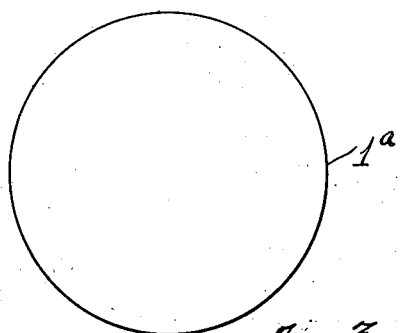
Figure 4:
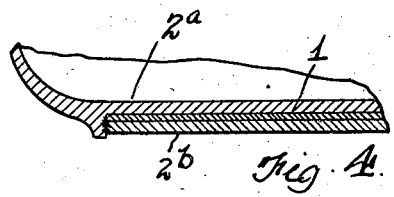
Figure 5:
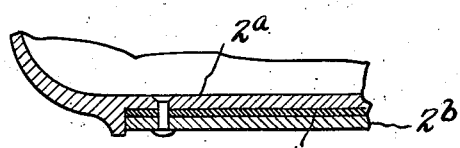

Fig. 1 is a vertical section through a utensil constructed in accordance with my invention; Figs. 2 and 3 are plan views of insert plates that may be employed; and Figs. 4 and 5 are sectional details showing modified constructions.

In constructing utensils to obviate the tendencies of aluminum above mentioned, I may employ aluminum generally for the wall of the utensils but use a dissimilar metal, for instance iron or nickel or the like, galvanized iron, tinned iron, steel, etc., in the bottom or portion subjected to and receiving the direct heat. Preferably I incorporate the dissimilar metal with the aluminum in the bottom. This may be as a layer of aluminum and one of the dissimilar metal or the dissimilar metal may be interposed between layers of aluminum, being incorporated as at 1 with the aluminum 2 cast thereabout (Fig. 1). Or the dissimilar metal 1 may be assembled against the bottom $2^a$ and a cover layer of aluminum $2^b$ is then secured thereover as desired, for instance by welding (Fig. 4), or riveting (Fig. 5). The dissimilar metal may take various forms as the shapes of the utensils and the conditions in view determine. A plate of iron for instance, as a plain disk $1^a$ (Fig. 3) or a perforated disk $1^b$ (Fig. 2), will ordinarily be a convenient form for utensils of the general character shown in Fig. 1. Plates, sheets, grids, or strips however, may be employed as desired.

Other modes of applying the principle of my invention may be employed instead of the one explained, change being made as regards the features herein described, provided the structure stated by any of the following claims or the equivalent of such stated structure be employed.

I therefore particularly point out and distinctly claim as my invention:—

1. The combination with a cast aluminum cooking vessel comprising a bottom wall and side walls, of a plate of iron, nickel, or equivalent metal interposed and rigidly held between inner and outer layers of aluminum of the bottom wall thereof.

2. The combination with a cooking vessel formed of relatively thick aluminum and having an aluminum heat-receiving wall, of a plate of metal of greater stiffness than aluminum interposed between the inner and outer surfaces of the heat receiving wall of said vessel and rigidly secured thereto to prevent the warpage of said wall under the effect of heat.

Signed by me this 13th day of November, 1925.

JACOB FAULK.